(12) United States Patent
Stooker et al.

(10) Patent No.: US 8,808,068 B2
(45) Date of Patent: Aug. 19, 2014

(54) METHOD OF AND SYSTEM FOR AUTOMATICALLY REMOVING MEAT FROM AN ANIMAL EXTREMITY

(71) Applicant: Foodmate B.V., Oud-Beijerland (NL)

(72) Inventors: Dirk Cornelis Stooker, Puttershoek (NL); Gerrit Hendrik Woltman, Goudswaard (NL); Jacobus Eliza Hazenbroek, Klaaswaal (NL)

(73) Assignee: Foodmate BV (NL)

( * ) Notice: Subject to any disclaimer, the term of this patent is extended or adjusted under 35 U.S.C. 154(b) by 0 days.

(21) Appl. No.: 13/804,258

(22) Filed: Mar. 14, 2013

(65) Prior Publication Data

US 2014/0120815 A1    May 1, 2014

(30) Foreign Application Priority Data

Oct. 29, 2012  (NL) .................................. 2009717

(51) Int. Cl.
*A22B 5/16* (2006.01)
*A22C 21/00* (2006.01)

(52) U.S. Cl.
CPC ......... *A22C 21/0076* (2013.01); *A22C 21/0069* (2013.01)
USPC ...................................................... 452/125

(58) Field of Classification Search
USPC ................................................. 452/135–138
See application file for complete search history.

(56) References Cited

U.S. PATENT DOCUMENTS

| 3,811,152 A * | 5/1974 | Herubel .................. 452/136 |
| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,011,573 A | 3/1977 | Braico |
| 4,034,440 A | 7/1977 | van Mil |
| 4,096,950 A | 6/1978 | Brook |
| 4,118,829 A | 10/1978 | Harben, Jr. |
| 4,131,973 A | 1/1979 | Verbakel |

(Continued)

FOREIGN PATENT DOCUMENTS

| EP | 0 763 326 A1 | 3/1997 |
| EP | 0 786 208 A1 | 7/1997 |

(Continued)

OTHER PUBLICATIONS

European Search Report—NL 2004574, Jan. 3, 2011, Foodmate B.V.

(Continued)

*Primary Examiner* — Richard Price, Jr.
(74) *Attorney, Agent, or Firm* — Womble Carlyle Sandridge & Rice LLP

(57) ABSTRACT

A method of automatically removing meat from an animal extremity that includes first and second bones articulated by a joint and surrounded by the meat. The method includes obtaining the animal extremity, holding the first bone at a free end thereof remote from the joint, separating the meat from the first bone while moving the meat lengthwise of the first bone in a direction toward the joint, and moving the meat just short of the joint. The method further includes severing the second bone from the first bone adjacent the joint, collecting the severed second bone with the meat attached thereto, holding the thus collected second bone at a distal end thereof and removing the meat from the second bone longitudinally thereof.

31 Claims, 10 Drawing Sheets

(56) References Cited

U.S. PATENT DOCUMENTS

| | | |
|---|---|---|
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,203,178 A | 5/1980 | Hazenbroek |
| 4,283,813 A | 8/1981 | House |
| 4,292,709 A | 10/1981 | van Mil |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,439,891 A | 4/1984 | van Mil |
| 4,468,838 A | 9/1984 | Sjöström et al. |
| 4,488,332 A * | 12/1984 | Atteck et al. ............... 452/136 |
| 4,510,886 A | 4/1985 | van Mil |
| 4,514,879 A | 5/1985 | Hazenbroek |
| 4,516,290 A | 5/1985 | van Mil |
| 4,524,489 A | 6/1985 | van Mil |
| 4,558,490 A | 12/1985 | Hazenbroek et al. |
| 4,559,672 A | 12/1985 | Hazenbroek et al. |
| 4,567,624 A | 2/1986 | van Mil |
| 4,570,295 A | 2/1986 | van Mil |
| 4,574,429 A | 3/1986 | Hazenbroek |
| 4,577,368 A | 3/1986 | Hazenbroek |
| D283,289 S | 4/1986 | Hazenbroek |
| 4,593,432 A | 6/1986 | Hazenbroek |
| 4,597,133 A | 7/1986 | van den Nieuwelaar |
| 4,597,136 A | 7/1986 | Hazenbroek |
| 4,635,317 A | 1/1987 | van der Eerden |
| 4,639,973 A | 2/1987 | van der Eerden |
| 4,639,974 A | 2/1987 | Olson |
| 4,639,975 A | 2/1987 | van der Eerden |
| 4,646,384 A | 3/1987 | van der Eerden |
| 4,651,383 A | 3/1987 | van der Eerden |
| 4,653,147 A | 3/1987 | van der Eerden |
| 4,682,386 A | 7/1987 | Hazenbroek et al. |
| 4,704,768 A | 11/1987 | Hutting et al. |
| 4,723,339 A | 2/1988 | van den Nieuwelaar et al. |
| 4,724,581 A | 2/1988 | van den Nieuwelaar |
| 4,736,492 A | 4/1988 | Hazenbroek et al. |
| RE32,697 E | 6/1988 | Hazenbroek et al. |
| 4,765,028 A | 8/1988 | van den Nieuwelaar et al. |
| 4,766,644 A | 8/1988 | van den Nieuwelaar et al. |
| 4,769,872 A | 9/1988 | Hazenbroek et al. |
| 4,779,308 A | 10/1988 | van den Nieuwelaar et al. |
| 4,788,749 A | 12/1988 | Hazenbroek et al. |
| 4,811,456 A | 3/1989 | Heuvel |
| 4,811,458 A | 3/1989 | v.d. Nieuwelaar et al. |
| 4,811,462 A | 3/1989 | Meyn |
| 4,813,101 A | 3/1989 | Brakels et al. |
| 4,884,318 A | 12/1989 | Hazenbroek |
| 4,893,378 A | 1/1990 | Hazenbroek et al. |
| 4,894,885 A | 1/1990 | Markert |
| 4,896,399 A | 1/1990 | Hazenbroek |
| 4,899,421 A | 2/1990 | Van Der Eerden |
| 4,918,787 A | 4/1990 | Hazenbroek |
| 4,928,351 A | 5/1990 | van den Nieuwelaar et al. |
| 4,935,990 A | 6/1990 | Linnenbank |
| 4,939,813 A | 7/1990 | Hazenbroek |
| 4,958,694 A | 9/1990 | van den Nieuwelaar et al. |
| 4,965,908 A | 10/1990 | Meyn |
| 4,972,549 A | 11/1990 | Van Den Nieuwelaar et al. |
| 4,993,113 A * | 2/1991 | Hazenbroek ............... 452/136 |
| 4,993,115 A | 2/1991 | Hazenbroek |
| 5,001,812 A | 3/1991 | Hazenbroek |
| 5,013,431 A | 5/1991 | Doets |
| 5,015,213 A | 5/1991 | Hazenbroek |
| 5,019,013 A | 5/1991 | Hazenbroek |
| 5,026,983 A | 6/1991 | Meyn |
| 5,035,673 A | 7/1991 | Hazenbroek |
| 5,037,351 A | 8/1991 | van Den Nieuwelaar et al. |
| 5,041,054 A | 8/1991 | van den Nieuwelaar et al. |
| 5,045,022 A | 9/1991 | Hazenbroek |
| 5,060,596 A | 10/1991 | Esbroeck |
| 5,064,402 A | 11/1991 | Koops |
| 5,067,927 A | 11/1991 | Hazenbroek et al. |
| 5,069,652 A | 12/1991 | Hazenbroek |
| 5,074,823 A | 12/1991 | Meyn |
| 5,088,959 A | 2/1992 | Heemskerk |
| 5,090,940 A | 2/1992 | Adkison |
| 5,098,333 A | 3/1992 | Cobb |
| 5,104,351 A | 4/1992 | van den Nieuwelaar et al. |
| 5,122,090 A | 6/1992 | van den Nieuwelaar et al. |
| 5,123,871 A | 6/1992 | van den Nieuwelaar et al. |
| 5,125,498 A | 6/1992 | Meyn |
| 5,147,240 A | 9/1992 | Hazenbroek et al. |
| 5,147,241 A | 9/1992 | Rudin |
| 5,154,664 A | 10/1992 | Hazenbroek et al. |
| 5,154,665 A | 10/1992 | Hazenbroek |
| RE34,149 E | 12/1992 | Markert |
| 5,173,076 A | 12/1992 | Hazenbroek |
| 5,173,077 A | 12/1992 | van den Nieuwelaar et al. |
| 5,176,562 A | 1/1993 | Martin |
| 5,176,563 A | 1/1993 | van den Nieuwelaar et al. |
| 5,176,564 A | 1/1993 | Hazenbroek |
| 5,178,890 A | 1/1993 | van den Nieuwelaar et al. |
| 5,186,679 A | 2/1993 | Meyn |
| 5,188,559 A | 2/1993 | Hazenbroek |
| 5,188,560 A | 2/1993 | Hazenbroek |
| 5,194,035 A | 3/1993 | Dillard |
| 5,197,917 A | 3/1993 | Verbakel et al. |
| 5,199,922 A | 4/1993 | Korenberg et al. |
| 5,222,905 A | 6/1993 | Van den Nieuwelaar et al. |
| 5,242,324 A | 9/1993 | Koops |
| 5,248,277 A | 9/1993 | Bos et al. |
| 5,256,101 A | 10/1993 | Koops |
| 5,269,721 A | 12/1993 | Meyn |
| 5,277,649 A | 1/1994 | Adkison |
| 5,277,650 A | 1/1994 | Meyn |
| 5,279,517 A | 1/1994 | Koops |
| 5,290,187 A | 3/1994 | Meyn |
| 5,299,975 A | 4/1994 | Meyn |
| 5,299,976 A | 4/1994 | Meyn |
| 5,318,428 A * | 6/1994 | Meyn ........................ 452/106 |
| 5,326,311 A | 7/1994 | Persoon et al. |
| 5,334,083 A | 8/1994 | van den Nieuwelaar et al. |
| 5,336,127 A | 8/1994 | Hazenbroek |
| 5,340,351 A | 8/1994 | Minderman et al. |
| 5,340,355 A | 8/1994 | Meyn |
| 5,342,237 A | 8/1994 | Kolkman |
| 5,344,359 A | 9/1994 | Kolkman |
| 5,344,360 A | 9/1994 | Hazenbroek |
| 5,366,406 A | 11/1994 | Hobbel et al. |
| 5,370,574 A | 12/1994 | Meyn |
| 5,372,246 A | 12/1994 | van Aalst |
| RE34,882 E | 3/1995 | Meyn |
| 5,429,059 A * | 7/1995 | Wagoner et al. ............... 110/234 |
| 5,429,549 A | 7/1995 | Verrijp et al. |
| 5,439,702 A | 8/1995 | French |
| 5,453,045 A | 9/1995 | Hobbel et al. |
| 5,462,477 A * | 10/1995 | Ketels ........................ 452/135 |
| 5,470,194 A | 11/1995 | Zegers |
| 5,487,700 A | 1/1996 | Dillard |
| 5,490,451 A | 2/1996 | Nersesian |
| 5,494,479 A * | 2/1996 | Lindert et al. ............... 452/135 |
| 5,505,657 A | 4/1996 | Janssen et al. |
| 5,549,521 A | 8/1996 | van den Nieuwelaar et al. |
| D373,883 S | 9/1996 | Dillard |
| 5,569,067 A | 10/1996 | Meyn |
| 5,595,066 A | 1/1997 | Zwanikken et al. |
| 5,605,503 A | 2/1997 | Martin |
| 5,643,072 A | 7/1997 | Lankhaar et al. |
| 5,643,074 A | 7/1997 | Linnenbank |
| 5,672,098 A | 9/1997 | Veraart |
| 5,676,594 A | 10/1997 | Joosten |
| 5,704,830 A | 1/1998 | Van Ochten |
| 5,713,786 A | 2/1998 | Kikstra |
| 5,713,787 A * | 2/1998 | Schoenmakers et al. ..... 452/136 |
| 5,741,176 A | 4/1998 | Lapp et al. |
| 5,755,617 A | 5/1998 | van Harskamp et al. |
| 5,759,095 A | 6/1998 | De Weerd |
| 5,766,063 A | 6/1998 | Hazenbroek et al. |

(56) References Cited

U.S. PATENT DOCUMENTS

| | | | |
|---|---|---|---|
| 5,782,685 A * | 7/1998 | Hazenbroek et al. ......... 452/138 |
| 5,785,588 A | 7/1998 | Jacobs et al. |
| 5,803,802 A | 9/1998 | Jansen |
| 5,810,651 A | 9/1998 | De Heer et al. |
| 5,810,653 A * | 9/1998 | Van Craaikamp et al. ... 452/136 |
| 5,813,908 A * | 9/1998 | Craaikamp .................. 452/136 |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,961,383 A * | 10/1999 | Janssen et al. ................ 452/135 |
| 5,975,029 A | 11/1999 | Morimoto et al. |
| 5,976,004 A * | 11/1999 | Hazenbroek .................. 452/136 |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,033,299 A | 3/2000 | Stone et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,530,466 B2 | 3/2003 | Murata et al. |
| 6,599,179 B1 | 7/2003 | Hazenbroek et al. |
| 6,612,919 B2 | 9/2003 | Janset et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 6,986,707 B2 | 1/2006 | van Den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | van Den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | Van Esbroeck et al. |
| 7,530,888 B2 * | 5/2009 | Annema et al. ............... 452/167 |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 8,591,298 B1 * | 11/2013 | Watson et al. ................. 452/135 |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0320761 A1 | 12/2009 | Grave et al. |
| 2010/0022176 A1 | 1/2010 | Van Den Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn |

FOREIGN PATENT DOCUMENTS

| | | |
|---|---|---|
| EP | 1 538 113 A1 | 6/2005 |
| EP | 2 181 841 A1 | 5/2010 |
| FR | 2 529 177 A1 | 12/1983 |
| GB | 1 395 722 A | 5/1975 |
| WO | WO 03/039262 A2 | 5/2003 |

OTHER PUBLICATIONS

Written Opinion—NL 2004574, Jan. 3, 2011, Foodmate B.V.
PCT/NL2011/050267—International Preliminary Report on Patentability, Oct. 23, 2012, Foodmate B.V.
Extended European Search Report for EP 13190747.9 dated Jan. 24, 2014.

* cited by examiner

METHOD OF AND SYSTEM FOR AUTOMATICALLY REMOVING MEAT FROM AN ANIMAL EXTREMITY

TECHNICAL FIELD

The invention relates to a method of automatically removing meat from an animal or poultry extremity. In particular an animal extremity that includes first and second bones articulated by a joint and surrounded by said meat, such as a whole leg or wing of poultry.

BACKGROUND

Methods of and apparatus for automatically deboning meat and obtaining meat from poultry legs and thighs have been proposed by patent documents U.S. Pat. No. 5,277,649, U.S. Pat. No. 5,401,210, and U.S. Pat. No. 6,699,116. While these automated processes have performed in the past with some degree of success, the mechanical complications and the necessary financial investment have put these processes within reach of only the largest meat processing industries.

Accordingly there has been a growing demand for an automated process that is reliable, simple, cost-effective, and economically feasible also for relatively small sized meat processing industries at the same time.

Hence it is an aspect of the present invention to propose an improved method of automatically removing meat from an animal or poultry extremity that includes first and second bones articulated by a joint and surrounded by said meat. In a more general sense it is an object of the present invention to at least overcome or ameliorate one or more of the disadvantages of the prior art. It is also an object of the present invention to at least provide alternative processes and structures that are less cumbersome in use and which can be provided and used relatively inexpensively. At any rate the present invention is at the very least aimed at offering a useful choice and contribution to the existing art.

SUMMARY

To this end the present invention provides a method of automatically removing meat from an animal or poultry extremity that includes first and second bones articulated by a joint and surrounded by said meat, as defined in the appended claims. The method advantageously comprises: providing the animal or poultry extremity; holding the first bone at a free end thereof remote from the joint; mechanically separating the meat from the first bone and moving the meat lengthwise of the first bone in a direction toward the joint; optionally continuing moving the meat just short of the joint; severing the second bone from the first bone at or adjacent the joint; collecting the severed second bone with all the meat attached thereto; holding the thus collected second bone at a distal end thereof remote from an end that was attached to the first bone; mechanically separating and removing the meat from the second bone longitudinally thereof in a direction toward the end that was attached to the first bone and optionally beyond the joint; and collecting the meat. By intermediate severing of the first and second bones adjacent the joint, the process is split into two basically similar steps of removing meat from a bone. This two-step process makes it possible to use existing and proven equipment that only needs to be modified slightly. Optionally the step of providing the animal or poultry extremity can further be preceded by lengthwise pre-cutting the surrounding meat. Alternatively or additionally a step of removing skin from the animal or poultry extremity may be included in the process. In that regard the step of removing skin from the animal or poultry extremity may precede the step of separating the meat from the first bone, and may even precede the step of holding the first bone. Preferably the animal or poultry part de-skinned automatically in-line, so that no separate steps or equipment are necessary. Prior removal of skin is optional, but when skinless meat is specified by a customer, prior removal may have preference over skin removal afterwards.

Advantageously the step of separating the meat from the first bone is preceded by tendon cutting and optionally the step of separating and removing the meat from the second bone can also be preceded by tendon cutting.

While several methods of severing of the second bone at the joint are conceivable, it is preferably performed by cutting. Cutting can be performed accurately and reduces the risk of inedible remnants to remain attached to the meat.

It has further been found efficient when the free end of the first bone and the distal end of the second bone retain their knuckles, so that these can conveniently be held by their bone knuckles. In particular the steps of holding the first bone and the second bone may include engaging the free end by a bone holder device. Bone holders as described herein below may be employed to retain the bone knuckles in a slot of a bifurcated receiving hook, optionally secured by a locking arm. As is well known to the skilled person other and additional gripper or jaw means may also be employed for this purpose.

The method of the present invention can advantageously be used for animal or poultry extremities such as a whole leg part, comprising a thigh and a lower leg. In particular the arrangement may conveniently be that the first bone is a lower leg bone (tibia) and the second bone is a thigh bone (femur). This arrangement may have advantages when in-line skin removing is included in the method in advance of the step of separating the meat from the first bone. The animal or poultry extremity, which then is a whole leg part, is thereby suspended with its flared outward hip portion facing the in-line skin removing equipment.

The step of separating the meat from and moving it lengthwise of the first bone advantageously includes engaging the first bone by a first meat stripper and moving of the first meat stripper away from the free end of the first bone in the direction of the joint.

The step of collecting the severed second bone with all the attached meat may include allowing the severed second bone and attached meat to drop by gravity onto a conveying means.

The step of separating and removing the meat from the second bone also advantageously includes engaging the second bone by a second meat stripper and moving of the second meat stripper longitudinally away from the distal end in the direction of the end that was previously attached to the first bone. Thereby the step of holding the collected second bone at its distal end may further advantageously include engaging the distal end with its remaining hip knuckle by the same bone holder device that has previously held the free end of the first bone. Such an option will further reduce the equipment requirement and enable a very cost effective setup that suites even the smallest meat processing shops.

When separating the meat from the first bone, moving it in the direction toward the joint may alternatively also be continued by moving the meat beyond the joint, onto the second bone. In severing the second bone from the first bone, the separation may then be either at the joint or adjacent to the joint on the second bone. When severing is adjacent to the joint on the second bone, a knuckle part of the joint may also be conveniently removed from the second bone. However in the present examples preference is given to moving the meat beyond the joint, when removing it from the second bone, which advantageously is a hip bone of a whole poultry leg.

The step of collecting the meat may further include allowing the meat to be engaged by a transport means.

According to a further aspect of the invention a system is also provided that comprises means arranged for performing the steps of the method as discussed above.

In the system according to the invention the means for severing the second bone from the first bone and/or the means for collecting the severed second bone with the meat can be arranged to be optionally deactivated.

An optional use of the system according to the invention can also be made for removing meat from animal or poultry extremity parts that include only a single bone. In this case the system may be operated in duplex to replace two individual de-boner apparatuses. This latter option is attractive for medium sized meat processing industries and allows accommodation of varying production runs with a minimum of equipment.

Further advantageous aspects of the invention will become clear from the appended description and in reference to the accompanying drawings, which are briefly described as follows:

DETAILED DESCRIPTION

Figure 1:
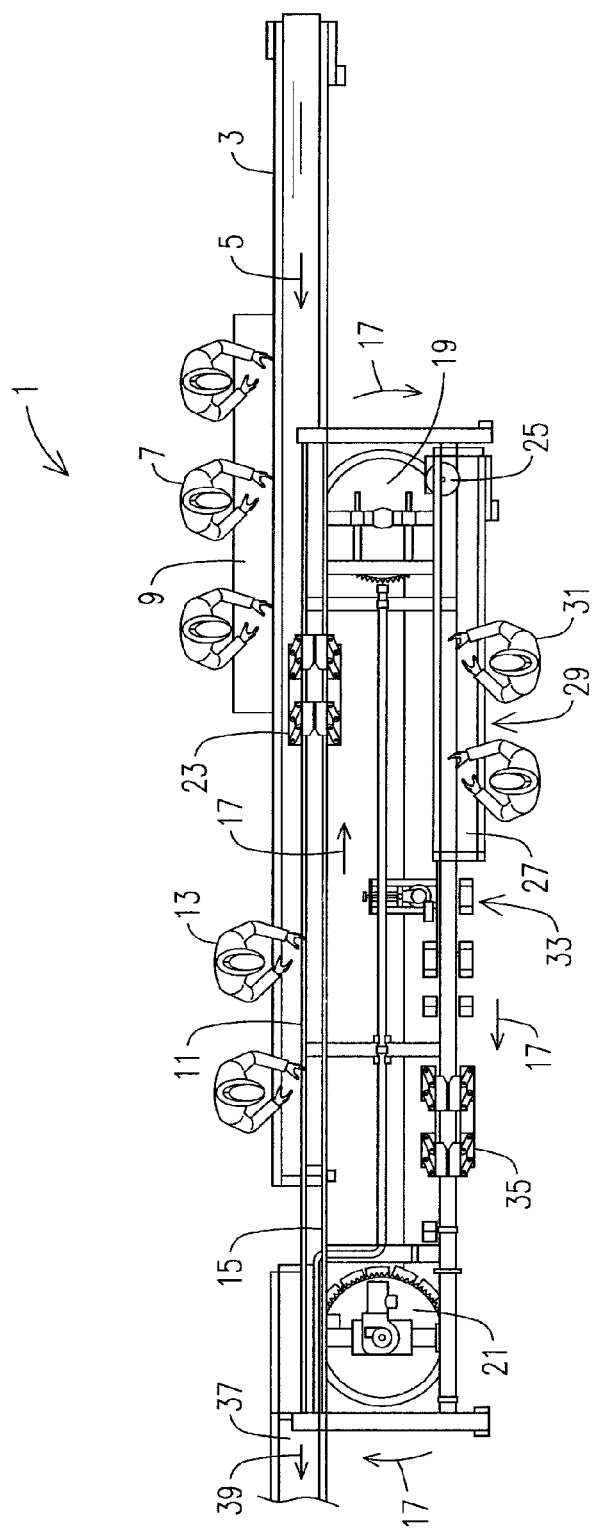
FIG. 1 is a top plan view of an automated system for removing meat from poultry legs and thighs according to the invention.

The system 1 shown in FIG. 1 is suitable for practising the method of the invention in deboning whole legs of poultry. The leg part of slaughtered poultry is supplied to the system 1 by a first belt conveyor 3. The first belt conveyor 3 conveys the leg parts in the direction of arrow 5. The leg parts may optionally be de-skinned in advance, or be de-skinned in-line by means to be referred to herein below. A first crew of perating personnel 7 at a pre-cut station 9 then one-by-one take the leg parts and perform a lengthwise pre-cut on the leg part. The lengthwise pre-cut leg parts from the first belt conveyor 3 are then placed back on the first belt conveyor 3 and progress to a loading station 11 where a second crew operating personnel 13 hang the presented leg parts by an ankle knuckle of its lower leg bone (also referred to as tibia or drum bone) onto individual ones of a plurality of bone holders (not shown, but conventional) of an overhead conveyor 15. The overhead conveyor 15 is arranged to move in a direction indicated by arrows 17. The overhead conveyor 15 is looped around a first carousel 19, and a second carousel 21. Before entering the first carousel 19 the bone holders each holding the whole leg parts from the lower leg bone, pass through a first tendon and/or tissue cutter station 23. While the first cutter station 23 will not be described here in detail, it can comprise an arrangement of either or both parallel knife blades and/or rotating knife blades. A suitable embodiment of a drum cutting unit will be described in more detail herein below.

After cutting of the drum tendon the leg parts are advanced about the first carousel 19, where first meat scrapers (not shown, but to be described further on) separate the meat from the lower leg or drum bone and move the meat lengthwise of the lower leg bone in the direction of the knee joint. The meat is moved just short of the knee joint, while the leg part is advanced to a rotating knife unit 25. Upon passing the rotating knife unit 25 the upper leg bone (also referred to as thigh bone, hip bone, or femur) with the drum meat collected thereon is severed from the drum bone adjacent the knee joint. The rotating knife unit 25 can be adjusted to be accurately adjacent to the joint. The severed thigh bone with the joint and the meat thereby drops down and is collected on a second belt conveyor 27, which moves in the same direction as the overhead conveyor 15. The lower leg or drum bone still suspended from the bone holder is then automatically unloaded and discharged, before the bone holders pass a re-hanging station 29, where a third crew of operating personnel 31 hang the severed upper leg bones collected on the second belt conveyor 27, onto the emptied bone holders by a distal end thereof, comprising the hip knuckle, opposite to the end associated with the knee joint. From the re-hanging station 29 the upper leg bones with the attached meat are advanced in the direction of arrows 17 to an oyster cut station 33. Passing through the oyster cut station 33 causes the oyster of the upper leg bone to be cut.

From the oyster cut station 33 the upper leg bones and meat are conveyed through a second tendon and/or tissue cutter station 35, where the remaining tendons are cut. From the second tendon cutter station 35 the upper leg bones with meat progress to the second carousel 21. At the second carousel 21 second meat scrapers (not shown, but to be described further on) separate and remove the meat from the upper leg bone in a direction of the end associated with the knee joint. The meat removing step performed at the second carousel 21 is completed when the bone holders have reached a position above a third belt conveyor 37. This third belt conveyor 37 collects the meat that drops down from the upper leg bones and moves in a direction indicated by arrow 39 for further processing. The thigh bone part still held by the bone holder may then be ejected and is collected separately, so that empty bone holders are ready for re-entering the loading station 11. In this manner a continuous process is accomplished by the system 1.

The system 1 that performs the steps of the method will be described in further detail in reference to FIGS. 2 to 4, while FIG. 5 relates to an optional de-skinner.

As explained in reference to FIG. 1 the first carousel 19 is associated with first meat scrapers for a first meat removing step, while the second carousel 21 is associated with second meat scrapers for performing a second meat removing step. These meat scrapers can be fairly conventional units and can be generally similar to those described in U.S. Pat. No. 4,893,378. With appropriate adaptations similar meat scrapers can also be employed for removing meat from the lower leg bone and for removing meat from the upper leg bone, or thigh bone. Accordingly only a section of the system 1, relevant to tendon cutting and meat scraping of the thigh bone as associated with the second carousel 21 will be described in reference to FIGS. 2 to 4 for explaining the method of the invention.

Figure 2:
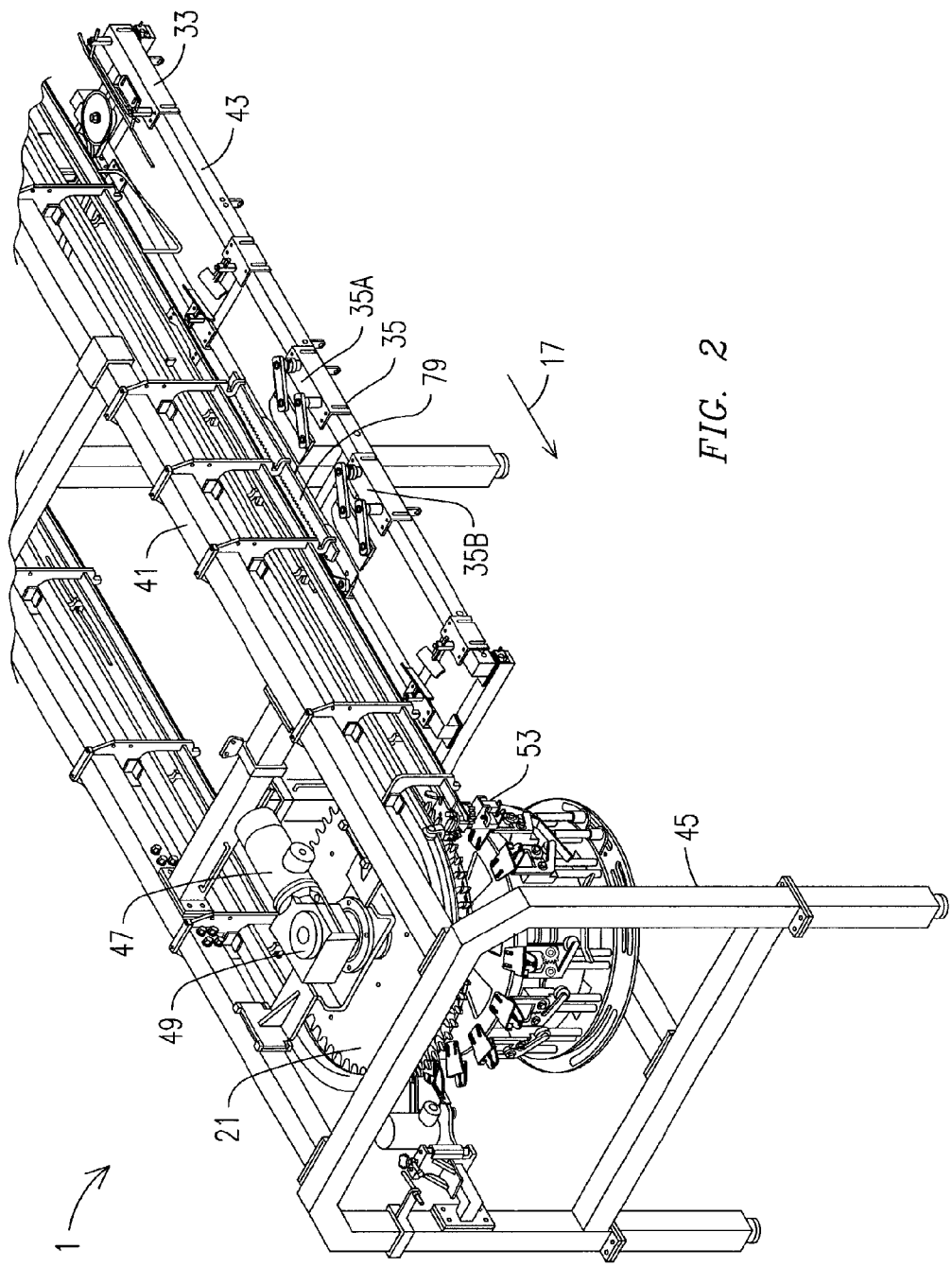
FIG. 2 is a partial perspective view of a tissue cutting and meat scraping section suitable for the system of FIG. 1.
Figure 3:
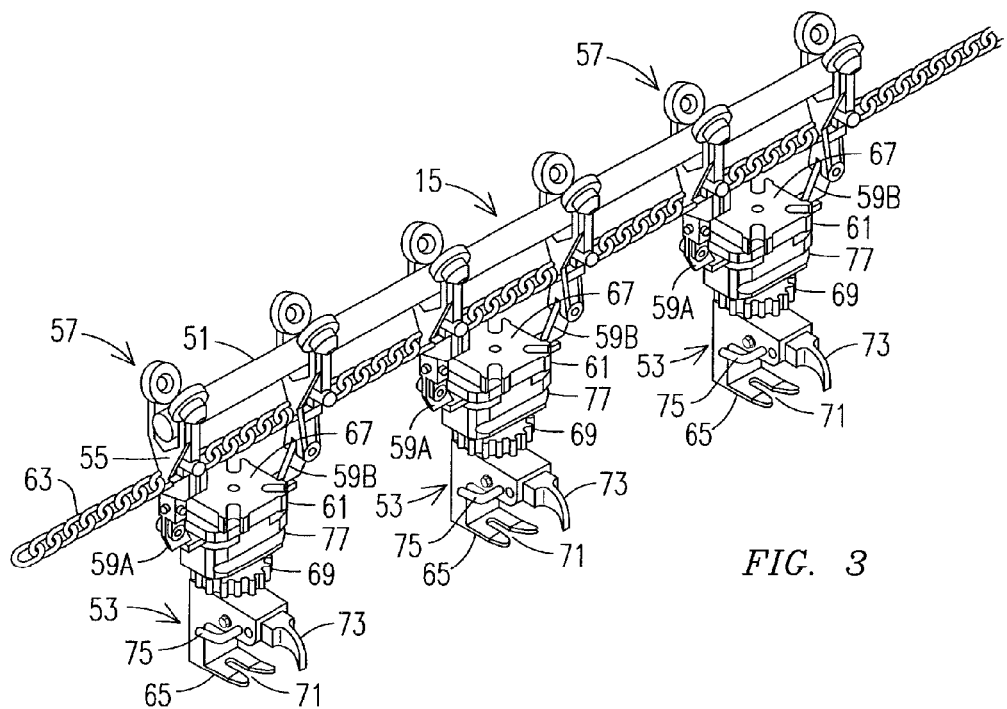
FIG. 3 is a schematic perspective view of an arrangement of an overhead conveyor with bone holders suitable for use in the device of FIGS. 1 and 2.

The tissue or tendon cutting and meat scraping associated with the first carousel 19 is generally similar to the section of the system shown in FIG. 2. However each of the relevant tissue or tendon cutting stations may optionally comprise any arrangement of either or both parallel knife blades and/or rotating knife blades as indicated above. Routine adaptations within the skilled person's capability may additionally be included as well. None of this has any bearing on the general principles of the method according to the invention.

Arriving at a linear conveyor section 41 from the re-hanging station 29 the bone holders loaded with upper leg bones hung from their hip knuckles first encounter the oyster or first tissue cut station 33 where the oyster is cut. After the oyster cutting station 33 the thigh bones continue towards the second or further tissue cutting station 35, which represents the second tendon cutter station, where the tendons are cut by a succession of a first pair of parallel knife blades 35A and a second pair of parallel knife blades 35B. The oyster cut station 33 and the first and second pairs of parallel knife blades 35A, 35B are conveniently mounted on sub-frame 43 that may be adjustably mounted with respect to a system support frame 45. Another suitable embodiment of a thigh cutting unit will be described in more detail herein below.

The second carousel 21, which also drives the overhead conveyor 15, including its linear section 41, is itself driven by an electric motor 47 that drives the second carousel 21 through gear transmission 49. The arrangement of the overhead conveyor 15 and its bone holders is schematically illustrated in FIG. 3. An overhead track 51 supports a plurality of bone holders 53. The bone holders 53 are each suspended from the overhead track 51 by roller units 55 and rollers 57 each engaging the overhead track 51. Each bone holder 53 is suspended from the roller units 55 by first and second brackets 59A, 59B and includes a bone holder block 61. The individual bone holder blocks 61 and roller units 55 are spaced along the overhead track 51 by a chain 63. The bone holder blocks 61 each rotatably support a receiving hook 65 that can be rotated by a turning gear 67 and a rotating gear pinion 69. The receiving hooks 65 each have a bifurcated lower end that defines a receiving slot 71. The receiving slot 71 is adapted to receive the relevant bone end, which in this example is the hip knuckle end of the thigh bone. The receiving slot 71 can be closed by a swivable locking arm 73 for securely retaining the bone that is engaged in the receiving slot 71. The swivable locking arm 73 can be operated by an arm lever 75 controlled automatically by the system 1. The bone holder blocks 61 are further provided with guide groves 77 useful in retaining the bone holders 53 in position during operations performed on the poultry thighs held thereby. For a more detailed description of the bone holders and their functioning, reference may also be had to published patent application document WO 2012/102609.

Reverting now to FIG. 2 the bone holders 53 (only one is shown for clarity) move the poultry thighs for tendon cutting through the first and second pairs of knife blades 35A, 35B towards the second carousel 21. During passage of the cutting station 35, a toothed rack 79 ensures that the receiving hooks 65 of the bone holders 53 are rotated by their gear pinion 69, so that the first and second pairs of opposite knife blades 35A, 35B cut around the entire bone shaft of the thighs.

Figure 4:
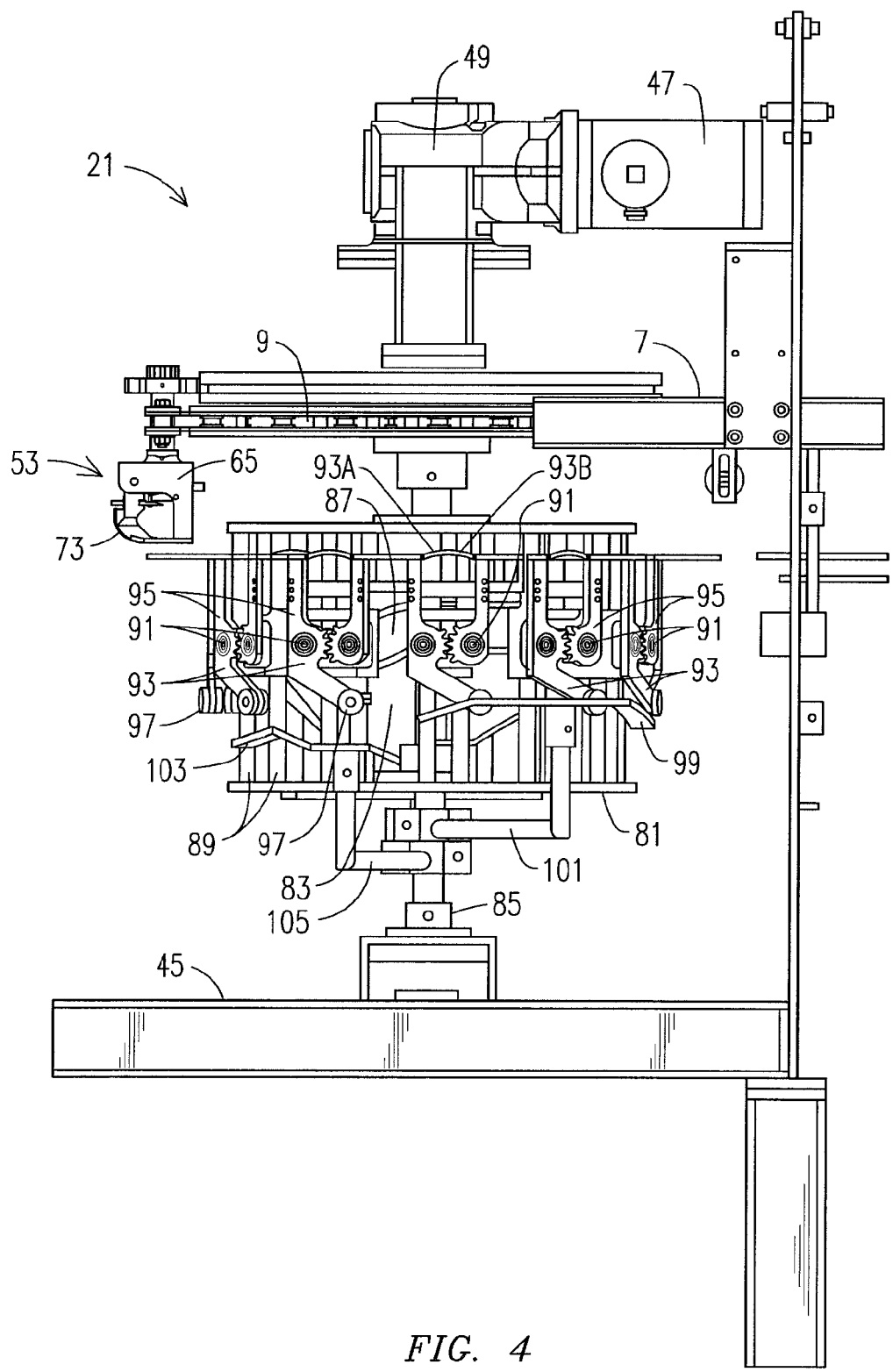
FIG. 4 is a schematic side elevation of a meat scraping carousel of a type suitable for use in the automated system of FIG. 1.

The meat stripping and discharging can best be understood by reference to FIG. 4, which shows a side elevation of the second carousel 21. The second carousel 21 includes a rotating cage 81, which is rotated by motor 47 about a stationary cam drum 83. The stationary cam drum 83 is non-rotatably mounted from a pedestal 85 attached to the system's frame 45. The stationary cam drum 83 carries a cam track 87 about its perimeter. The rotating cage has a plurality of pairs of parallel bars 89 defining a perimeter that surrounds the stationary cam drum 83. Meat stripper units 91 are slidable up-and-down the pairs of parallel bars 89, and do so by the action of a respective roller engaged with the cam track 87 (not shown in detail, but conventional). Each stripper unit 91 has a pair of opposite first and second gripper arms 93, 95, which are mutually coupled by toothed gear segments. At their upper ends the first and second gripper arms 93, 95 carry gripper plates 93A, 93B for scraping the meat along the bone shaft of (in this example) the poultry thighs. Each of the first gripper arms 93 at its lower end has a cam follower roller 97 for engaging a first auxiliary stationary cam track 99 held by a first outrigger 101, as well as a second auxiliary stationary cam track 103 held by a second outrigger 105. The first and second auxiliary cam tracks 99, 103 are positioned about the perimeter of the rotating cage 81 and move the gripper plates 93A, 93B away from one another. The gripper plates 93A, 93B are biased to their closed position by conventional spring means (not shown). Again a more detailed description of the meat stripping and discharge operation performed at the second carousel can be found in published patent document WO 2012/102609.

The section of the system as here described and including the second carousel 21 is arranged to perform the method step of separating and removing the meat, previously collected on the upper leg bone and to discharge it onto the third belt conveyor 37 (shown in FIG. 1).

Figure 5:
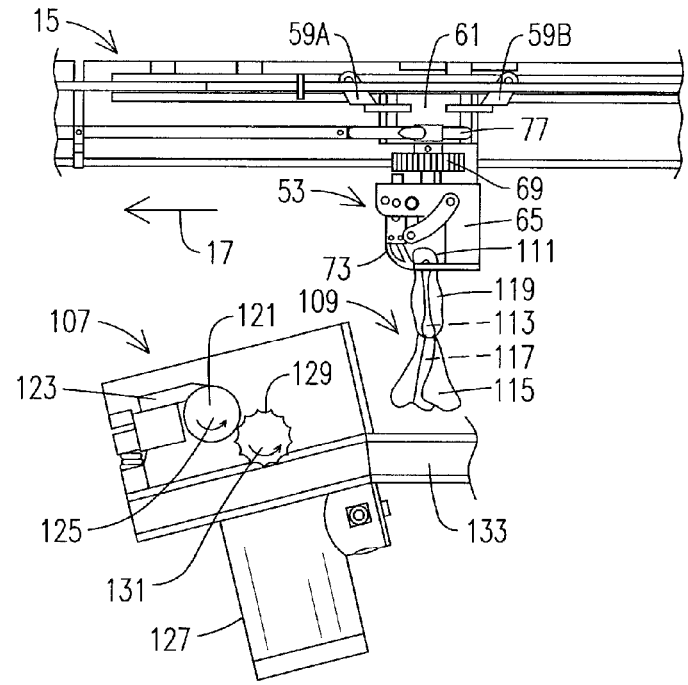
FIG. 5 is a schematic side elevation of a de-skinning station suitable for optional use in the system of FIG. 1.

Optionally a de-skinner unit 107 as shown in FIG. 5 may be included in the conveying path between the loading station 11 and the first tendon cutter station 23 of the system 1 (FIG. 1). The poultry leg part 109 in FIG. 5 is shown as hung in the loading station (11 in FIG. 1) with an ankle knuckle 111 of the lower leg bone 113 held by the receiving hook 65 of the bone holder 53. The bone holder 53 as shown in FIG. 5 moves in the direction of arrow 17 and in its path passes the de-skinner unit 107. The poultry leg part 109 is suspended with its thigh portion 115 hanging downwardly and its thigh bone or upper leg bone 117 still attached to the lower leg bone 113 by the knee joint. The drum meat 119 still being in position on the lower leg bone 113 and the knee joint adds stability to the leg part 109. The skin and meat on the hip end of the thigh now hanging down is flared out and allows the skin to be easily grasped.

The de-skinner unit 107 has a rotating gripper roller 121. The gripper roller 121 rotates in close proximity to a cutting blade 123 that creates a slit between itself and the gripper roller 121 for grasping skin. The gripper roller 121 on its outer cylindrical surface is provided with axially extending serrations for gripping the skin and pulling it along the slit defined between the gripper roller 121 and the cutting blade 123. The gripper roller 121 is rotated in the direction of arrow 125 by a motor unit 127 and is preferably rotated at a speed that on its outer surface equals or exceeds the speed of the overhead conveyor 15 that moves the bone holder 53 across the de-skinning unit 107. To clean remaining skin from the gripping roller 125 a cleaning roller 129 is provided. The cleaning roller 129 is rotated in the same sense as the gripper roller 121 as indicated by arrow 131, and may be driven by the same motor unit 127. However it is preferred that the cleaning roller 129 is rotated at a significantly higher speed than the gripper roller 121, which may be accomplished through appropriate gearing. The cleaning roller 129 may have different or similar axial serrations on its cylindrical surface.

The entire de-skinning unit 107 and the overhead conveyor 15 are both mounted to the frame 45 of the system, which is not shown in the partial view of FIG. 5, but is conventional. Preferably the de-skinning unit 107 is mounted height adjustably to the system frame 45 by a mounting bar 133, which is partially shown in FIG. 5. The removed skin can be collected from the de-skinning unit 107 by a chute, or similar, conventional structure.

Alternatively a de-skinner unit 107 or skin remover unit can also be positioned after the re-hanging station 29 and before the oyster cutting station 33, along the linear conveyor section 41. De-skinning is then effected only before the meat previously collected on the hip bone 117 will be processed. The meat separated (at the first carousel 19) from the lower leg bone 113, while moving it lengthwise of the lower leg bone 113 just short of the joint, then also will include the skin. The poultry thigh portion 115, 117 travelling along the linear conveyor section 41 is then urged against the rotating gripper roller 121 and the skin is pinched between the cutting blade 123, as described herein above. As the thigh portion 115, without the drum bone or lower leg bone 113, is substantially shorter than the whole leg part 109, the de-skinner unit 107 needs to be positioned at a higher level with respect to overhead conveyor 15. In use, the skin remover unit 107 is thus arranged at an appropriate distance from the overhead conveyor section 41 such that the animal thigh is first engaged by the rotating gripper roller 121, before coming in contact with the fixed knife blade 123. While the location of the skin remover unit 107 may thus vary along the overhead conveyor 15, it is important for it to be aligned therewith and to be at a proper height.

Figure 6:
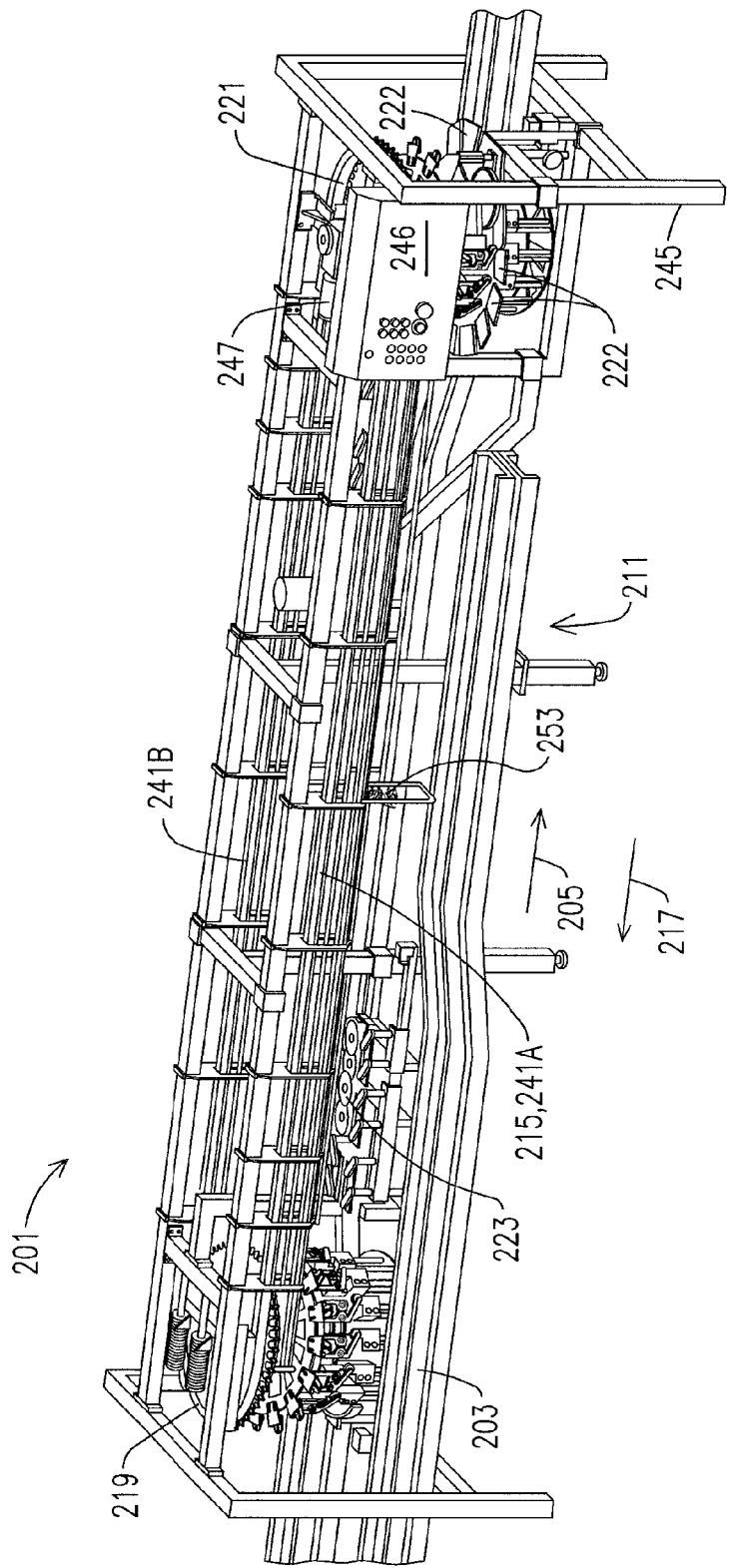
FIG. 6 is a perspective view showing a slightly modified system according to the invention from a first side and with several safety covers removed.

A further embodiment of the system described in reference to FIGS. 1 to 5 will now be described in reference to FIGS. 6 to 12. Reference numerals as used for similar components will generally differ from those of FIGS. 1 to 4 by addition of "200". In FIG. 6 a first side of system 201 is shown to reveal a first carousel 219 and a second carousel 221 mounted in a support frame 245. The first and second carousels 219, 221 are positioned at opposite ends of first and second linear conveyor sections 241A, 241B. A first belt conveyor 203 moves a supply of poultry legs in a direction of arrow 205 toward a loading station 211. At the loading station 211 individual poultry legs are manually hung by an ankle knuckle from bone holders 253 spaced along the first linear conveyor section 214A of overhead conveyor 215. The overhead conveyor 215 moves in a direction of arrow 217, opposite to the belt conveyor 203. The poultry legs by the overhead conveyor 215 are advanced to a lower leg part pre-cutting unit 223 where tendon and tissue of the poultry drum are cut, before passing around the first carousel 219 towards the second linear conveyor section 241B. In use the system 201 will be clad with safety covers, which in FIG. 6 are removed for clarity. The first side of the system as shown in FIG. 6 is also provided with an operating panel 246 with control switches for operating the system 201.

Figure 7:
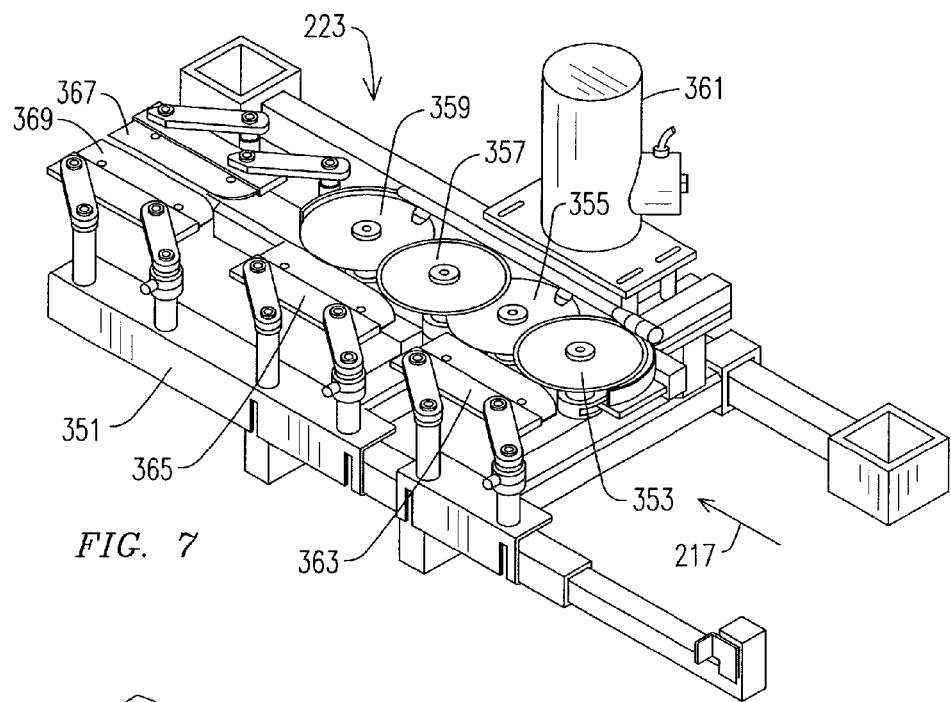
FIG. 7 is a perspective view of a lower leg pre-cutting unit as included in the view of FIG. 6.

In FIG. 7 the drum pre-cutting unit 223 is shown in greater detail. The drum cutting unit 223 comprises a drum cutter sub-frame 351 for mounting to the system frame 245. The movement direction of the whole leg parts with respect to the drum part cutting unit 223 is indicated by arrow 217. Mounted on the sub-frame 351 for first engaging the poultry drums is an array of partly overlapping rotating knife blades 353, 355, 357, 359, driven by an electric motor 361. The rotating knife blades 353-359 are opposed by yieldingly mounted first and second linear knife blades 363, 365. The lower leg tendon and tissue holding the meat from the ankle end of the poultry leg are passed between the opposed rotating and linear knife blades 353-359, 363, 365. Following the rotating knife blades is a further pair of opposed linear knife blades 367, 369 for performing further tissue cutting on the lower leg or drum part. The drum meat is then at the first carousel 219 moved along the lower leg bone shaft towards the knee joint.

Figure 8:
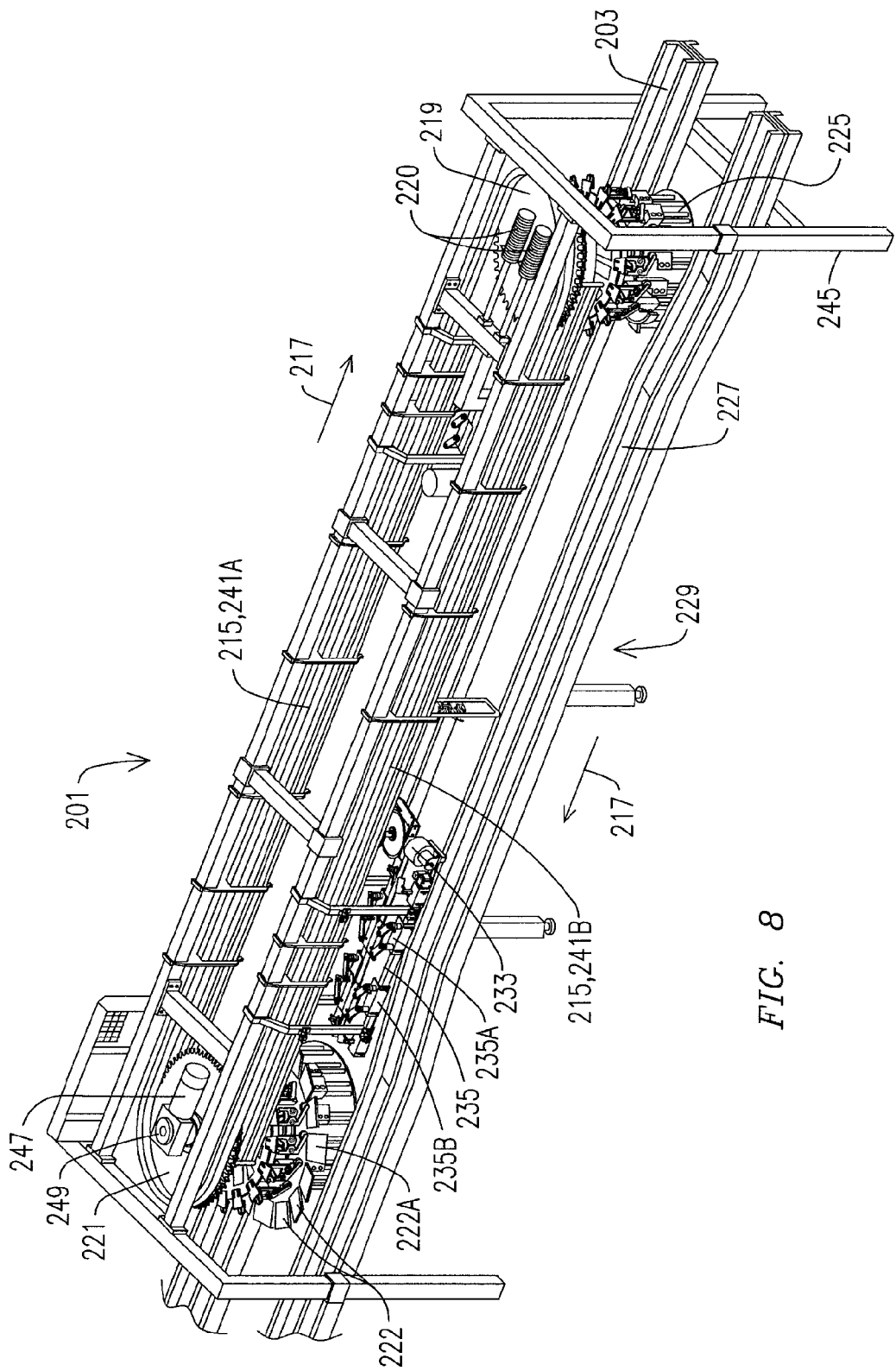
FIG. 8 is a perspective view of the system of FIG. 6 from an opposite second side, also with its covers removed.

In FIG. 8 a second side of the system 201 of FIG. 6 is shown. Again any safety covers that may cover the system in use have been removed for clarity. As seen best in FIG. 8, the first carousel 219 is idle, while the second carousel 221 is driven by an electric motor 247 via a gear transmission 249. The first carousel may be spring urged by springs 220 to keep the linear sections 241A, 241B of the overhead conveyor chain in a tensioned condition. Thereby the overhead conveyor 215 is driven in the direction indicated by arrows 217. A second belt conveyor 227, which also moves in the direction of the second linear portion 241B of the overhead conveyor, is used to collect upper leg parts that are cut by rotating knife unit 225. The cut-off upper leg parts are transported by the second belt conveyor 227 to a re-hanging station 229, where the upper leg parts are manually hung to bone holders of the overhead conveyor 215, 241B. The upper leg parts are re-hung by their hip knuckles. Then the upper leg parts or thighs are transported along the second linear conveyor section 214B to a second tendon and tissue cutter station 235. After the second tendon and tissue cutter station 235 the upper leg parts will pass around the second carousel 221 where the meat is removed from the thigh bone shaft and over the knee joint. The meat is then collected on tipping trays 222 at a lower end of the second carousel 221. In this regard the system 201 differs from the system 1 described in reference to FIGS. 1-5, by unloading the meat onto the second belt conveyor 227, rather than using a third belt conveyor (37 in FIG. 1). To this end the second belt conveyor 227 extends along the entire second side of the system 201. A tipping mechanism (not shown, but conventional) tips the trays 222 as indicated at 222A, when it is over the second conveyor 227 after a full 360 degree rotation. The transport of the meat through an additional half rotation of the second carousel 221 does not interfere with the thighs being processed about the second carousel 221.

Figure 9:
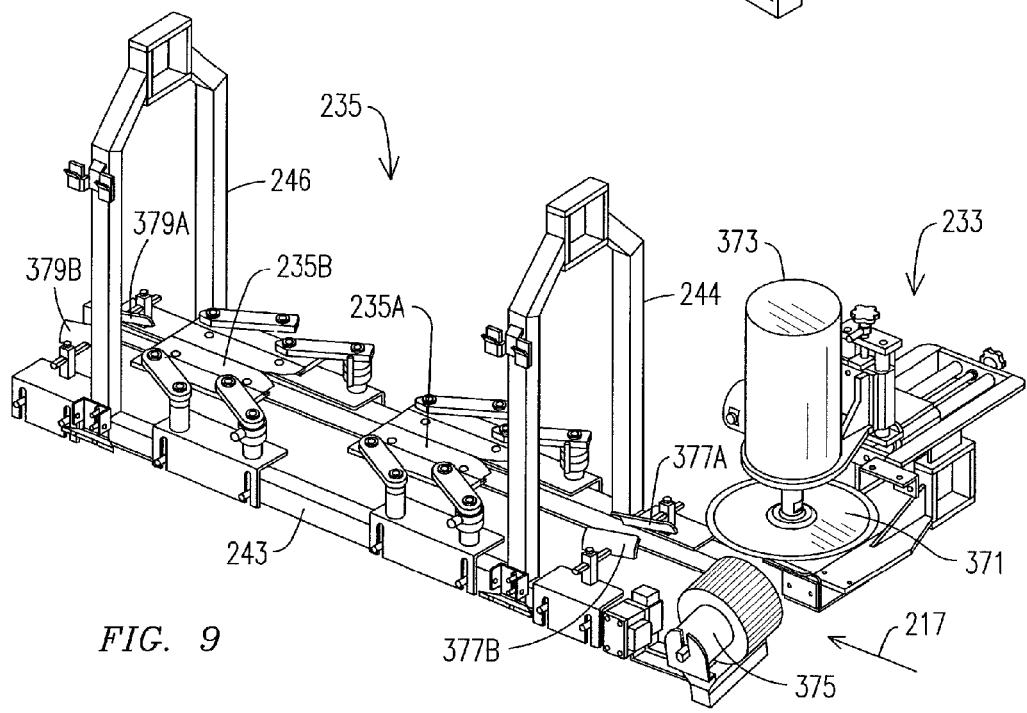
FIG. 9 is a perspective view of an upper leg pre-cutting unit as included in the view of FIG. 8.

FIG. 9 shows in greater detail the second tendon and tissue cutter unit 235 for pre-cutting the thighs. The thigh pre-cutting unit 235 comprises a thigh cutter sub-frame 243, which is suspended in a stationary manner from a support rail of the overhead conveyor section 241B by first and second stirrups 244, 246. An oyster cut station 233 is positioned with respect to the sub-frame 243 for cutting the oyster of the thigh portion approaching in the direction of arrow 217. The oyster cut station may also be mounted from the thigh cutter sub-frame 243, but in this example is partly mounted to the system frame 245. The oyster cut station 233 comprises a rotating knife 371, driven by an electric motor 373. This relatively heavy portion of the oyster cut station 233 is mounted from the system frame 245. The oyster cut station 233 further comprises a motor driven guide roller 375, with a miniature electric motor internally of the roller. This guide roller 375 is conveniently mounted on the thigh cutter sub-frame 243 and engages a lower end of the upper leg part hung by its hip knuckle. After passing the oyster cut station 233 the hip knuckle suspended from the bone holder then passes over a first pair of meat pushers 377A, 377B. The first pair of meat pushers 377A 377B pushes the meat free from the hip knuckle. When passing from the first stirrup 244 to the second stirrup 246, the bone holder is rotated by a toothed rack, as described in reference to FIG. 2 and passes between first and second pairs of opposed linear knife blades 235A, 235B. The rotating movement of the bone shaft and the yieldable spring bias urging the knife blades of each pair 235A, 235B together ensures that tissue near the hip knuckle that connects the meat to the bone shaft is completely cut. In general the arrangement of the successive pairs of parallel cutting blades 235A, 235B is very similar to those described in applicant's WO 2012/102609. The number of revolution and the amount of rotation of the thigh portion between the stirrups 244, 256 is chosen such that he thigh portion will be entering a second pair of meat pushers 379A, 379B at a rotational position 90 degrees different from that at the first pair of meat pushers 377A, 377B. This ensures than the second meat pushers 379A, 379B act on different portions of the meat surrounding the hip knuckle that the first meat pushers 377A, 377B. Upon passing the second pair of meat pushers 379A, 379B the meat is sufficiently pushed downward from the hip knuckle to ensure reliable engagement by the meat stripper units associated with the second carousel 221. The meat stripper units associated with the second carousel 221 are substantially similar to those already described in reference to FIG. 4 and a repetition of that description is deemed superfluous.

The second carousel 221 merely differs by the provision of the tipping meat collecting trays 222, already described, and by additional bone support grippers 381 that will now be described in reference to FIGS. 10-12.

Figure 10:
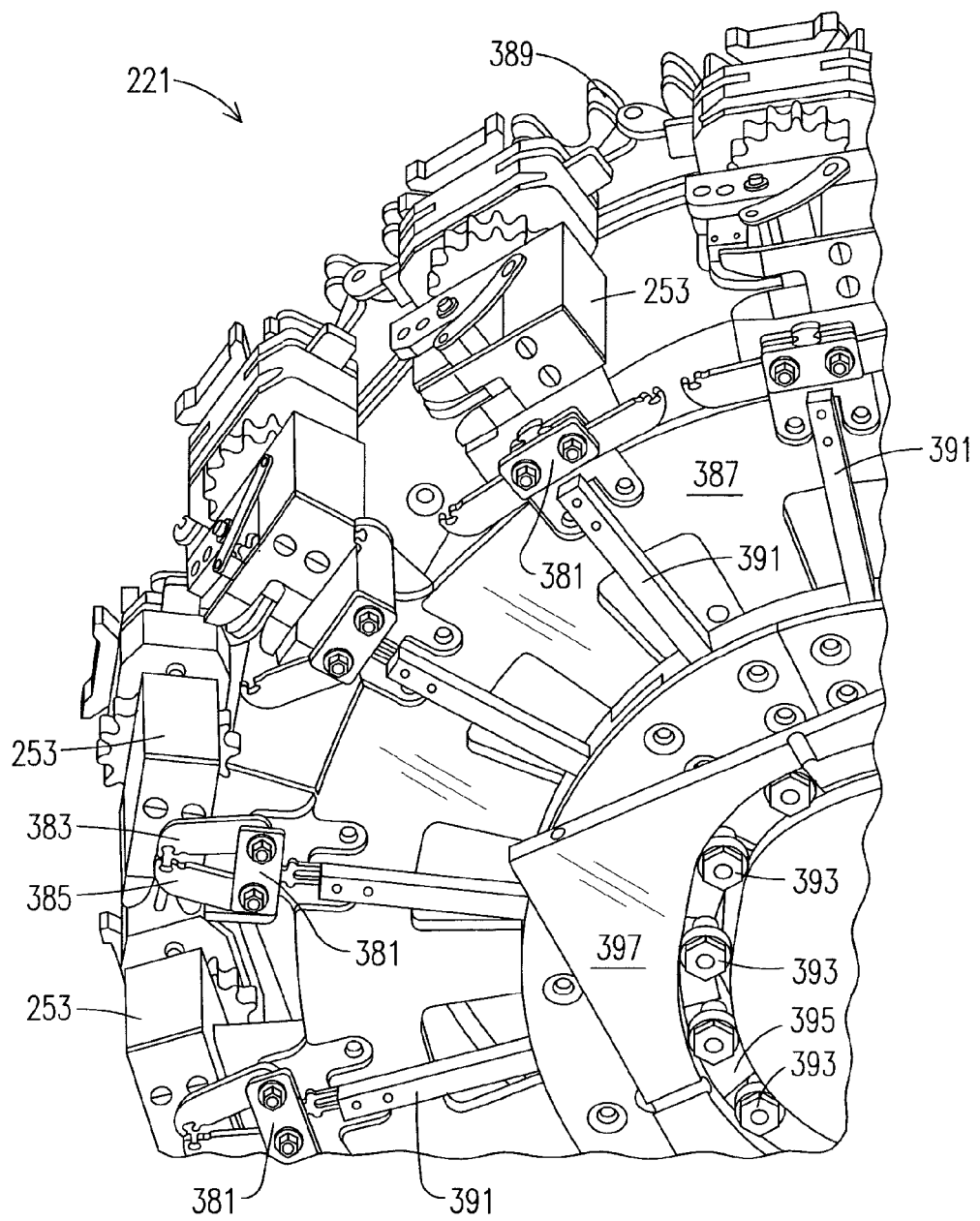
FIG. 10 is a partial perspective view from below of a second carousel included in the system of FIGS. 6 and 8.

FIG. 10 is a partial view from below showing an upper portion of the second carousel 221. The bone support grippers 381 are mounted directly underneath bone holders 253, which are generally similar to the bone holders 53 described in reference to FIG. 3. The bone support grippers 381 each have opposite swiveling gripper arms 383, 385. The bone support grippers are mounted on the perimeter of an auxiliary disc 387. The auxiliary disc 387 rotates together with chain wheel 389 that engages the chain of the overhead conveyor which is similar to the chain 63 illustrated in FIG. 3. Radially guided with respect to the auxiliary disc 387 is a plurality of push rods 391, which are each operatively associated with one of the bone support grippers 381. Each of the push rods 391 with an inner end thereof is guided by a guide roller 393 in a stationary guide track 395. The guide track 395 is part of a stationary cam drum (not shown but similar to stationary cam drum 83 of FIG. 4). As best seen in FIGS. 11 and 12, the push rods 391 extend with an outer end in the bone support grippers. The outer ends of the push rods 391 are formed with opposite toothed racks which engage with pinion gear segments 399 of each of the opposite swiveling arms 383, 385.

Figure 11:
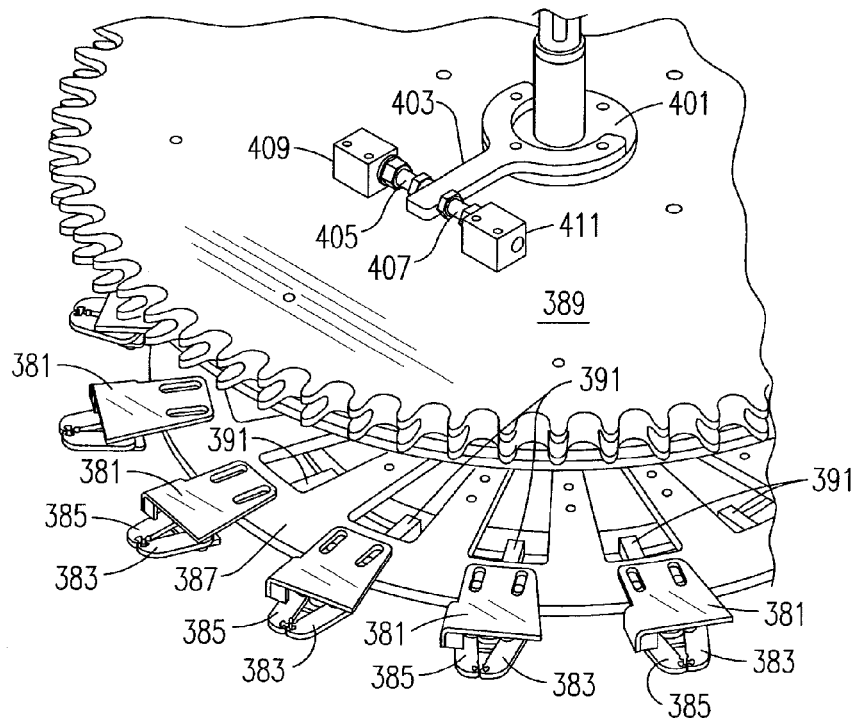
FIG. 11 is a partial perspective view from above of the second carousel with the bone holders deleted to show auxiliary bone supports in a closed position.
Figure 12:
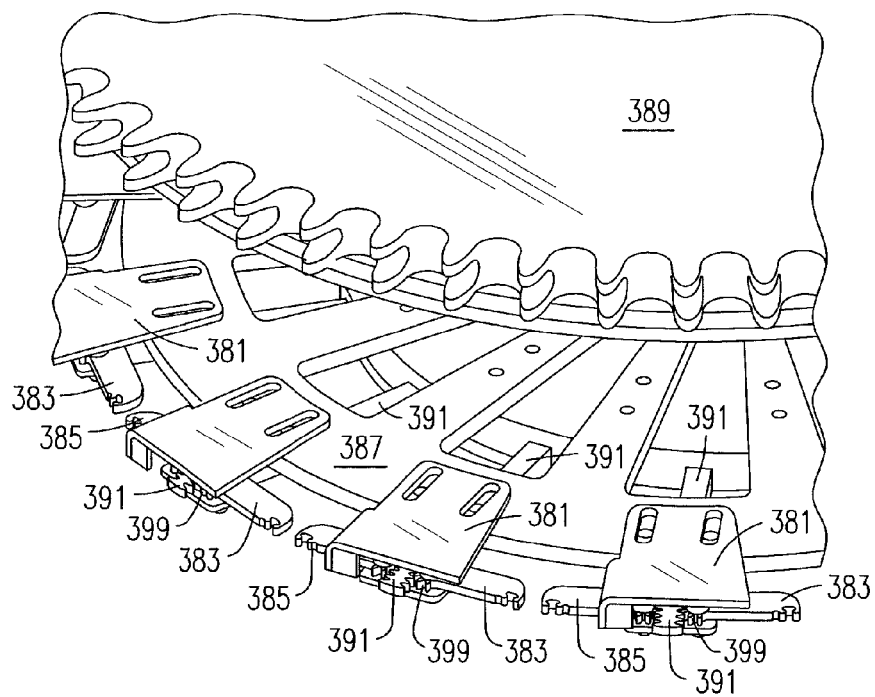
FIG. 12 is a detail view similar to FIG. 11, but with the auxiliary bone supports shown in an open position.

In FIG. 11 the push rods are in a retracted position, dictated by the guide track 395 and the rollers 393, while in FIG. 12 they are in an extended position. With the push rods 391 in their retracted position the swiveling gripper arms 383, 385 are closed against the bone shaft, while with the push rods 391 in an extended position the gripper arms 383, 385 are open. When the bone holders 253 are brought in to engagement with the second carousel 221 the gripper arms 383, 385 will be in the open position. Closing of the arms 383, 385 is accomplished when the bone holders are in full engagement with the second carousel 221 and in register with the meat scraping units thereof. The bone support grippers 381 provide additional support to the thigh bone shaft during removal of the meat therefrom.

The auxiliary disc 387, as also seen in FIG. 11 extends with a hub 401 through a centre of the chain wheel 389. An arm 403 is non-rotatably mounted to the hub 401. The arm 403 is engaged between opposite adjustment screws 405, 407, which are anchored to the chain wheel 389 by respective screw threaded blocks 409, 411. This adjustment provision allows a certain amount of relative angular adjustment between the auxiliary disc 387 and the chain wheel 389. This allows fine adjustment of the position of the bone support grippers 381 with respect to the bone holders 253. Such fine adjustment is also useful to adapt the system to variations in bone shaft diameter, which may occur between production batches.

The additional bone support grippers 381 provide extra support to the thigh bone shaft and remaining knee knuckle during removal of meat there from. Although not described in detail, it will be understood by the skilled person that skin removing units as described in relation to FIG. 5 may also be incorporated in the system of FIGS. 6 to 12.

Accordingly a method (and a system 1, 201) is disclosed for automatically removing meat from an animal or poultry extremity (poultry leg part 109) that includes first and second bones (lower and upper leg bones 113, 117) articulated by a joint and surrounded by the meat. The method includes a step (by the first belt conveyor 3), which provides the animal or poultry extremity (leg part 109), and a step (at loading station 11) of holding the first bone (optionally lower leg bone 113) at a free end thereof remote from the joint. Further the method includes a step (at the first carousel 19) of separating the meat from the first bone (113) while moving the meat lengthwise of the first bone in a direction toward the joint, and moving the meat just short of the joint. The method is continued by the steps (at the rotating knife unit 25, and the second belt conveyor 27) of severing the second bone (optionally thigh bone 117) from the first bone (113) adjacent the joint, and collecting the severed second bone (117) with all the meat collected thereon. In a continuation of the method the steps (at rehanging station 29, and second carousel 21) are performed of holding the thus collected second bone (117) at a distal end thereof remote from an end attached to the first bone and separating, as well as removing the meat from the second bone (117) longitudinally thereof in a direction toward the end attached to the first bone and beyond the joint. The continuation of the method is concluded with collecting the meat (by the third belt conveyor 37). The system (1, 201) has means for performing the steps of the method, as set out herein above.

Figure 13:
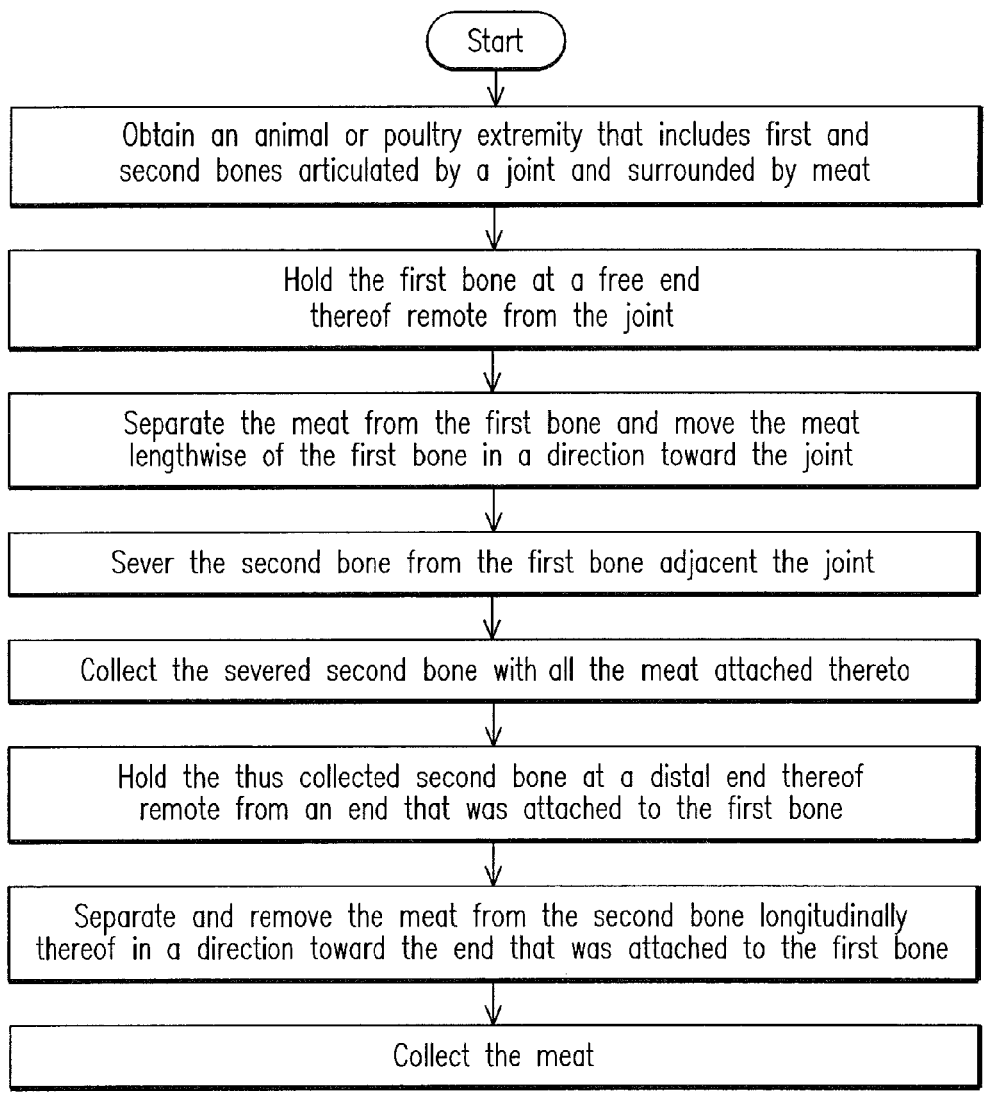
FIG. 13 is a flowchart illustrating one embodiment of a method of removing meat from an animal or poultry extremity according to the disclosure.

FIG. 13 is a flowchart illustrating the steps of a method of removing meat according to one embodiment of the disclosure.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention without affecting its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

What is claimed is:

1. Method of automatically removing meat from an animal or poultry extremity that includes first and second bones articulated by a joint and surrounded by said meat, the method includes:
    obtaining the animal or poultry extremity;
    holding the first bone at a free end thereof remote from the joint;
    separating the meat from the first bone and moving the meat lengthwise of the first bone in a direction toward the joint;
    severing the second bone from the first bone adjacent the joint;
    collecting the severed second bone with all the meat attached thereto;
    holding the thus collected second bone at a distal end thereof remote from an end that was attached to the first bone;
    separating and removing the meat from the second bone longitudinally thereof in a direction toward the end that was attached to the first bone; and
    collecting the meat.

2. Method according to claim 1, wherein the step of obtaining the animal or poultry extremity is preceded by lengthwise pre-cutting the surrounding meat.

3. Method according to claim 1 further comprising removing skin from the animal or poultry extremity.

4. Method according to claim 3, wherein the step of removing skin from the animal or poultry extremity precedes the step of separating the meat from the first bone, while the animal or poultry extremity is suspended from an overhead conveyor following the step of holding the first bone.

5. Method according to claim 3, wherein the step of removing skin from the animal or poultry extremity precedes the step of holding the first bone.

6. Method according to claim 3, wherein the step of removing skin from the animal or poultry extremity directly precedes the step of removing meat previously collected on the second bone.

7. Method according to claim 1, wherein the step of separating the meat from the first bone includes moving the meat just short of the joint, wherein the step of severing the second bone from the first bone includes severing of the first bone adjacent the joint and wherein the step of separating and removing the meat from the second bone includes moving the meat beyond the joint.

8. Method according to claim 1, wherein the step of separating the meat from the first bone is preceded by tendon cutting.

9. Method according to claim 1 wherein the step of separating and removing the meat from the second bone is preceded by tendon cutting.

10. Method according to claim 1, wherein severing of the second bone at the joint is performed by cutting.

11. Method according to claim 1, wherein the step of severing the second bone from the first bone is followed by releasing the first bone.

12. Method according to claim 1 wherein the step of separating and removing the flesh from the second bone is followed by releasing the second bone.

13. Method according to claim 1 wherein the free end of the first bone and the distal end of the second bone are bone knuckles.

14. Method according to claim 1 wherein the animal or poultry extremity is a whole leg part.

15. Method according to claim 1 wherein the first bone is a lower leg bone and the second bone is a thigh bone.

16. Method according to claim 1 wherein the step of holding the first bone includes engaging the free end by a bone holder device.

17. Method according to claim 1 wherein the step of separating the meat from and moving it lengthwise of the first bone includes engaging the first bone by a first meat stripper and moving of the first meat stripper away from the free end in the direction of the joint.

18. Method according to claim 1 wherein the step of collecting the severed second bone with all the attached meat includes allowing the severed second bone and attached meat to drop by gravity onto a conveying means.

19. Method according to claim 1 wherein the step of holding the collected second bone at the distal end thereof includes engaging the distal end by a bone holder.

20. Method according to claim 19 wherein the step of holding the collected second bone at the distal end thereof includes engaging the distal end by the bone holder device that has previously held the free end of the first bone.

21. Method according to claim 1 wherein the step of separating and removing the meat from the second bone includes engaging the second bone by a second meat stripper and moving of the second meat stripper longitudinally away from the distal end in the direction of the end previously attached to first bone by the joint.

22. Method according to claim 1 wherein the step of collecting the meat includes allowing the meat to be engaged by a transport means.

23. A system for performing the steps of the method according to claim 1.

24. System according to claim 23, including
    means for obtaining an animal or poultry extremity;
    means for holding a first bone at a free end thereof remote from a joint;
    first means for separating meat from the first bone and removing the meat lengthwise of the first bone in a direction toward the joint;
    means for severing the second bone from the first bone adjacent the joint;
    means for collecting the severed second bone with all the meat attached thereto;
    means for holding the thus collected second bone at a distal end thereof remote from an end that was attached to the first bone;
    second means for separating and removing meat from the second bone longitudinally thereof in a direction toward the end that was attached to the first bone; and
    means for collecting the meat.

25. System according to claim 24, wherein the means for holding the first bone and the means for holding the second bone are embodied as an overhead conveyor defining a closed loop conveying path and a plurality of bone holder devices arranged for being advanced through the conveying path.

26. System according to claim 25, wherein the overhead conveyor includes a first carousel and a second carousel positioned on opposite ends of first and second linear sections.

27. System according to claim 26, wherein the first means for separating and removing meat are associated with the first carousel and the second means for separating and removing meat are associated with the second carousel.

28. System according to claim 26 wherein a plurality of bone support grippers is associated with the second carousel, the bone grippers having an open position and a closed position for closing against a bone shaft of the second bone, when a confronting one of the plurality of bone holder devices is in full engagement with the second carousel.

29. System according to claim 24 wherein the first means for separating the meat from the first bone is arranged for continuing moving the meat just short of the joint, wherein the means for severing the second bone from the first bone includes severing of the first bone adjacent the joint and wherein the second means for separating and removing the meat from the second bone is arranged for moving the meat beyond the joint.

30. System according to claim 24 wherein the means for severing the second bone from the first bone and the means for collecting the severed second bone with the meat are arranged to be optionally deactivated.

31. Use of the system of claim 23 in removing meat from animal or poultry extremity parts that include only a single bone by operation in duplex.

\* \* \* \* \*